(12) United States Patent
Davidson et al.

(10) Patent No.: US 9,780,557 B2
(45) Date of Patent: Oct. 3, 2017

(54) ELECTRICAL APPARATUS

(71) Applicant: ALSTOM Technology Ltd, Baden (CH)

(72) Inventors: Colin Charnock Davidson, Stafford (GB); Robert Whitehouse, Stafford (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 94 days.

(21) Appl. No.: 14/653,683

(22) PCT Filed: Nov. 13, 2013

(86) PCT No.: PCT/EP2013/073734
§ 371 (c)(1),
(2) Date: Jun. 18, 2015

(87) PCT Pub. No.: WO2014/095168
PCT Pub. Date: Jun. 26, 2014

(65) Prior Publication Data
US 2015/0349520 A1 Dec. 3, 2015

(30) Foreign Application Priority Data
Dec. 18, 2012 (EP) ..................... 12275208

(51) Int. Cl.
*H02H 9/02* (2006.01)
*H02M 7/483* (2007.01)

(52) U.S. Cl.
CPC .............. *H02H 9/02* (2013.01); *H02M 7/483* (2013.01); *H02M 2007/4835* (2013.01)

(58) Field of Classification Search
CPC . H02H 9/02; H02M 7/483; H02M 2007/4835
See application file for complete search history.

(56) References Cited

U.S. PATENT DOCUMENTS 6,225,793 B1    5/2001  Dickmann
7,421,353 B1 *  9/2008  Pace ................... H02H 3/0935
                                              361/93.9
(Continued)

FOREIGN PATENT DOCUMENTS

CN    102148579        8/2011
CN    102299506 A     12/2011
(Continued)

OTHER PUBLICATIONS

English-language machine translation of DE 10103031, Marquardt Rainer (Jul. 25, 2002).
(Continued)

*Primary Examiner* — Zeev V Kitov
(74) *Attorney, Agent, or Firm* — GE Global Patent Operation; Scott R. Stanley (57) ABSTRACT

An electrical apparatus (10) comprises: first and second terminals (18,20) for connection to an electrical circuit; a chain-link converter (22) connected between the first and second terminals (18,20), the chain-link converter (22) including a plurality of chain-link modules (24), each chain-link module (24) including at least one switching element (26) and at least one energy storage device (28), the or each switching element (26) and the or each energy storage device (28) of each chain-link module (24) combining to selectively provide a voltage source; and a protection device (32) connected across an electrical block (34) that includes at least two of the plurality of chain-link modules (24), the protection device (32) including a plurality of series-connected semiconductor devices (36), wherein the protection device (32) selectively provides a current-conductive path to allow at least part of a current flowing in the electrical apparatus (10) to bypass the electrical block (34).

14 Claims, 9 Drawing Sheets

(56) References Cited

U.S. PATENT DOCUMENTS

| | | | |
|---|---|---|---|
| 2008/0232145 A1 | 9/2008 | Hiller et al. | |
| 2008/0291708 A1* | 11/2008 | Teichmann | H02M 1/32 363/50 |
| 2010/0066174 A1 | 3/2010 | Dommaschk et al. | |
| 2010/0085785 A1 | 4/2010 | Dommaschk et al. | |
| 2012/0063181 A1 | 3/2012 | Chimento et al. | |
| 2012/0155130 A1* | 6/2012 | Hosini | H02J 3/1864 363/64 |

FOREIGN PATENT DOCUMENTS

| | | |
|---|---|---|
| DE | 10103031 | 7/2002 |
| EP | 2100368 B1 | 9/2009 |
| WO | WO2011023237 | 3/2011 |
| WO | WO-2011/120572 A1 | 10/2011 |
| WO | WO2012122825 | 9/2012 |

OTHER PUBLICATIONS

English-language machine translation of EP 2100368, Siemens AG (Sep. 16, 2009).
International Search Report and Written Opinion for PCT/EP2013/073734; dated Mar. 20, 2014, 8 pages.
Chinese Search Report, App. No. 201380073221.5, General Electric Technology GmbH, 2 pages (dated Jan. 10, 2017).

\* cited by examiner

ELECTRICAL APPARATUS

This invention relates to an electrical apparatus.

When operating an electrical circuit or network, the electrical current flowing through the circuit or network is typically maintained within a predetermined current rating of the electrical circuit or network. However, fault or other abnormal operating conditions in the electrical circuit or network may lead to the development of a high fault current exceeding the current rating of the electrical circuit or network.

According to an aspect of the invention, there is provided an electrical apparatus comprising:

first and second terminals for connection to an electrical circuit;

a chain-link converter connected between the first and second terminals, the chain-link converter including a plurality of chain-link modules, each chain-link module including at least one switching element (e.g. a single switching element, or two or more switching elements) and at least one energy storage device, the or each switching element and the or each energy storage device of each chain-link module combining to selectively provide a voltage source; and a protection device connected in parallel with an electrical block that includes at least two of the plurality of chain-link modules, the protection device including a plurality of series-connected semiconductor devices, wherein the protection device selectively provides a current-conductive path to allow at least part of a current flowing in the electrical apparatus to fully bypass the electrical block.

It will be understood that, for the purposes of the specification, the term "connected across" is synonymous with the term "connected in parallel with". Likewise, connecting a first component "across" a second component is intended to mean that the first component is connected "in parallel with" the second component.

It will be appreciated that the connection of the protection device across (i.e. in parallel with) the electrical block is intended to specify the connection of a plurality of series-connected semiconductor devices across (i.e. in parallel with) a plurality of chain-link modules. The connection of the protection device across the electrical block means that the protection device is configured to allow a current flowing in the protection device to fully bypass the electrical block. In other words, a current flowing in the plurality of series-connected semiconductor devices of the protection device is inhibited from flowing into the plurality of chain-link modules forming part of the electrical block.

It will be further appreciated that the connection of the protection device across the electrical block in the electrical apparatus according to the invention is distinguished from configurations of semiconductor devices and chain-link modules in which each semiconductor device is connected in parallel with a respective chain-link module in a one-to-one correspondence (i.e. each semiconductor device is connected across a single chain-link module). Such connections of semiconductor devices and chain-link modules in a one-to-one correspondence means that a current flowing in a semiconductor device can only fully bypass a single chain-link module instead of a plurality of chain-link modules.

The electrical apparatus according to the invention may be any type of electrical apparatus that includes at least one chain-link converter to carry out its function. For example, the electrical apparatus may be, or may form part of, a voltage source converter that uses at least one chain-link converter for voltage conversion duties.

During normal operation of the electrical apparatus, the chain-link converter is operable to provide a stepped variable voltage source. The protection device is not directly involved in the normal operation of the electrical apparatus. As such, in use, the protection device is configured to minimise any effect it might have on the normal operation of the electrical apparatus.

In the event of a fault operating condition of the electrical apparatus, a fault current may flow through the electrical apparatus. The presence of the fault current not only may damage one or more components of the chain-link converter, but also may result in the chain-link converter being offline for a period of time. This results in increased cost of repair and maintenance of the damaged chain-link converter, and inconvenience to end users relying on the working of the electrical apparatus.

The inclusion of the protection device in the electrical apparatus enables formation of a current-conductive path to allow at least part of the current flowing in the electrical apparatus to bypass the electrical block and thereby reduce the amount of current flowing through the electrical block. This in turn reduces the risk of an overcurrent damaging one or more of the chain-link modules of the electrical block. In this manner the protection device protects the chain-link modules of the electrical block from being adversely affected by any fault current flowing through the electrical apparatus.

It will be appreciated that the number of chain-link modules in the electrical block may range from two up to all of the chain-link modules of the chain-link converter.

The protection device includes a plurality of series-connected semiconductor devices so that a failure of a single semiconductor device does not cause an external short circuit across the electrical block to which the protection device is connected. This is important since the creation of an external short-circuit across an off-state self-commutated semiconductor device forming part of a chain-link module can lead to an uncontrolled discharge of the or each corresponding energy storage device, via the conducting self-commutated semiconductor device, an event known as a "type 2 short circuit". Protecting against type 2 short-circuits can be difficult, and so it is beneficial to minimise the risk of their occurrence. In comparison use of only a single semiconductor device in the protection device would create a risk of occurrence of the aforementioned type 2 short circuit.

In addition the configuration of the protection device as set out above provides greater flexibility in terms of optimising the design of the protection device to improve its efficiency. For example, although the overall voltage rating of the protection device is required to match the overall voltage rating of the electrical block, the voltage rating of each series-connected semiconductor device of the protection device can be optimised independently of the individual voltage rating of each chain-link module of the electrical block. In contrast, use of a single semiconductor device as a protection device that is connected across a single chain-link module means that it is necessary to match the voltage rating of the single semiconductor device to the voltage rating of that single chain-link module, which may adversely affect the efficiency of the protection device in terms of cost, size and weight.

Furthermore the configuration of the protection device as set out above reduces the number of structural components, e.g. clamps, required to connect the protection device across the electrical block in comparison to the number of structural components required to connect multiple semiconductor devices each across a respective one of a plurality of chain-link modules. This in turn results in savings in terms of overall cost, size and weight of the electrical apparatus.

The plurality of series-connected semiconductor devices may be any one of:
- a plurality of series-connected passive semiconductor devices, e.g. a diode;
- a plurality of series-connected active semiconductor devices, e.g. a thyristor; or
- at least one active semiconductor device connected in series with at least one passive semiconductor device.

Use of at least one passive semiconductor device in the protection device eliminates or reduces requirements for a controller, e.g. a gate drive circuit, with associated power supply and communication links, since the or each passive semiconductor device can be designed to automatically conduct current upon certain conditions being met. On the other hand use of at least one active semiconductor device in the protection device provides active control over the formation of the current-conductive path to ensure that the current-conductive path is only formed under certain conditions, e.g. a fault operating condition of the electrical apparatus.

The combination of at least one active semiconductor device connected in series with at least one passive semiconductor device provides further flexibility in terms of optimising the design of the electrical apparatus to improve its efficiency, due to the different characteristics of active and passive semiconductor devices. For example, when the plurality of series-connected semiconductor devices include thyristors and diodes, the different forward and reverse voltage ratings of thyristors and diodes allows the protection device to be designed to have specific forward and reverse voltage ratings that cannot be achieved with either thyristors or diodes only.

In embodiments of the invention the protection device may be switched, in use, to a reverse biased state when at least one chain-link module of the electrical block is configured to provide a non-zero voltage in the non-bypassed mode, and a forward-biased state when all of the chain-link modules of the electrical block are configured to provide a zero voltage in the bypassed mode and the direction of current in the electrical block allows switching of the protection device to a forward-biased state.

The configuration of the electrical apparatus in this manner requires all of the chain-link modules of the electrical block to be in the bypassed mode before the current-conductive path can be formed. Thus, to minimise any effect the protection device might have on the normal operation of the electrical apparatus, the switching of the chain-link modules of the electrical block may be controlled to minimise the time during which the protection device is capable of forming the current-conductive path while the electrical apparatus is undergoing normal operation. This is particularly advantageous for configurations of the protection device of which the plurality of series-connected semiconductor devices only includes passive semiconductor devices.

Under circumstances in which the protection device does form the current-conductive path during normal operation of the electrical apparatus, the configuration of the protection device as set out above minimises any current overshoot that may occur when the protection device is subsequently reverse-biased.

In such embodiments the electrical apparatus may further include a switching control unit, wherein the switching control unit controls the switching of the chain-link modules of the electrical block to selectively configure at least one chain-link module of the electrical block in the non-bypassed mode so as to maintain the protection device in the reversed-biased state during normal operation of the electrical apparatus.

The use of such a switching control unit prevents unwanted formation of the current-conductive path during normal operation of the electrical apparatus.

Optionally the plurality of series-connected semiconductor devices may include: at least one passive semiconductor device, e.g. a diode, and the protection device may include a switching element to selectively inhibit or allow conduction of the or each passive semiconductor device. Such a switching element may be either distinct from the series-connected semiconductor devices or in the form of an active semiconductor device forming one of the plurality of series-connected semiconductor devices.

In still further embodiments of the invention the protection device may include at least one control circuit and at least one active semiconductor device, the or each control circuit being connected across a control electrode and an anode of the active semiconductor device or a respective one of the active semiconductor devices, wherein an impedance of the or each control circuit is variable to selectively allow a non-zero voltage to be applied across the control electrode and a cathode of the corresponding active semiconductor device in order to switch that active semiconductor device to an on-state.

The control circuit may include a resistive element with a non-linear voltage-current characteristic. Such a resistive element may include, but is not limited to, a varistor (e.g. a zinc-oxide varistor or a silicon carbide varistor), a Zener diode, a spark gap or a breakover diode.

The or each control circuit may be designed to automatically switch the corresponding active semiconductor device to an on-state, i.e. a conductive state, upon certain conditions being met. For example, in embodiments of the invention employing the use of at least one control circuit the impedance of the or each control circuit may vary to allow a non-zero voltage to be applied across the control electrode and a cathode of the corresponding active semiconductor device when the or each control circuit has a voltage thereacross that matches or exceeds a predetermined voltage threshold. This obviates the need for a separate controller that is capable of sensing and deciding when it is necessary to switch one or more of the series-connected semiconductor devices of the protection device in order to form the current-conductive path.

The predetermined voltage threshold may correspond to a fault operating condition of the electrical apparatus, so as to ensure that the current-conductive path is not formed during normal operation of the electrical apparatus.

Furthermore the predetermined voltage threshold may be below a safety voltage level which corresponds to failure of one or more components of the electrical block, so as to minimise the risk of failure of one or more components of the electrical block. Failure of a component of the electrical block is defined as a state of that component that does not allow the electrical block to carry out its normal function. Such failure may be caused by, for example, overcurrent and/or thermal stress.

In embodiments of the invention the electrical apparatus may further include a reactor connected in series with the plurality of chain-link modules, wherein the electrical block includes at least part of the reactor.

The initial flow of fault current through the electrical block causes a voltage drop to appear across the reactor. The presence of the voltage drop in the electrical block means that the current-conductive path formed by the protection device presents a lower impedance path for the fault current than the electrical block.

The reactor may be designed to optimise the proportion of current flowing through the protection device so as to reduce the amount of current flowing through the electrical block. Such design of the reactor may involve, for example, embodiments of the invention in which the protection device is connected to a tap on the reactor such that the electrical block includes part of the reactor, or embodiments of the invention in which the reactor is split into a plurality of reactor elements and the protection device is connected to a junction between two of the plurality of reactor elements such that the electrical block includes at least one of the reactor elements.

In further embodiments of the invention the electrical apparatus may include a plurality of protection devices. In such embodiments the electrical apparatus may include a plurality of protection devices and a plurality of electrical blocks, wherein each protection device is connected across a respective one of the electrical blocks, each electrical block including at least two of the plurality of chain-link modules, each protection device including a plurality of series-connected semiconductor devices, wherein each protection device selectively provides a current-conductive path to allow current flowing in the electrical apparatus to bypass the corresponding electrical block.

Preferred embodiments of the invention will now be described, by way of non-limiting examples, with reference to the accompanying drawings in which.

Figure 1A:
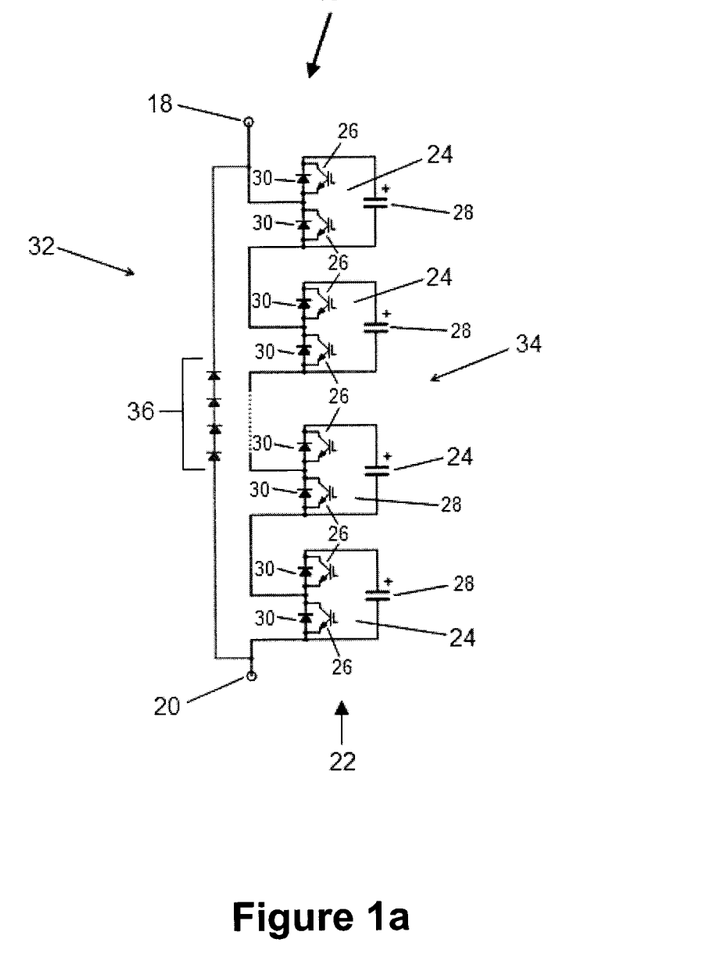
FIG. 1a shows, in schematic form, an electrical apparatus according to a first embodiment of the invention.
Figure 1B:
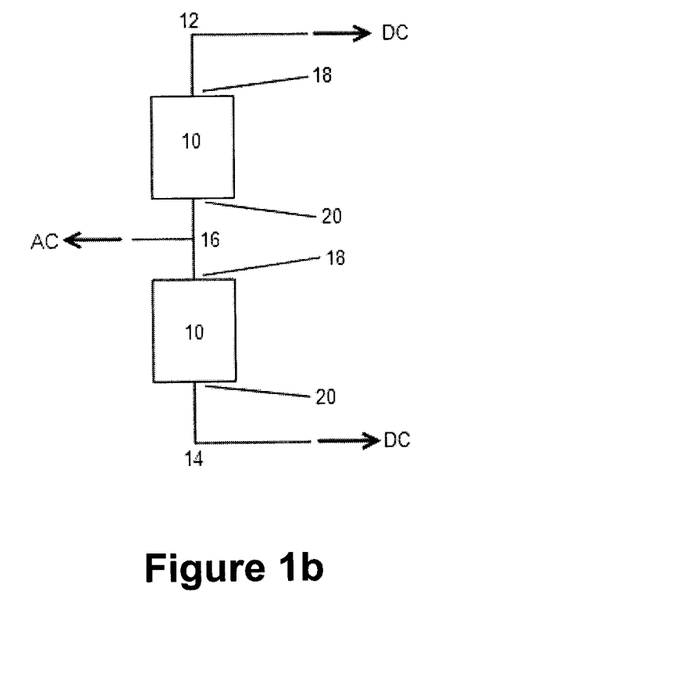
FIG. 1b shows, in schematic form, a voltage source converter.

A first electrical apparatus 10 according to a first embodiment of the invention is shown in FIG. 1a and forms part of a voltage source converter as shown in FIG. 1b.

The voltage source converter includes first and second DC terminals 12,14. A converter limb extends between the first and second DC terminals 12,14, and includes first and second limb portions separated by an AC terminal 16. Each of the first and second limb portions includes a first electrical apparatus 10, the structure of which is shown in FIG. 1a.

In use, the first and second DC terminals 12,14 are respectively connected to positive and negative terminals of a DC network, and the AC terminal 16 is connected to an AC network.

The first electrical apparatus 10 of each limb portion includes first and second terminals 18,20. The first and second terminals 18,20 of the first electrical apparatus in the first limb portion are respectively connected to the first DC terminal 12 and the AC terminal 16. The first and second terminals 18,20 of the first electrical apparatus in the second limb portion are respectively connected to the AC terminal 16 and the second DC terminal 14.

Each first electrical apparatus 10 includes a chain-link converter 22 connected between the first and second terminals 18,20. The chain-link converter 22 includes a plurality of chain-link modules 24. Each chain-link module 24 includes a pair of switching elements 26 connected in parallel with an energy storage device in the form of a capacitor 28. The pair of switching elements 26 and the capacitor 28 are connected in a half-bridge arrangement to define a 2-quadrant unipolar module that can provide zero or positive voltage and can conduct current in two directions.

Each switching element 26 is constituted by a semiconductor device in the form of an Insulated Gate Bipolar Transistor (IGBT). Each switching element 26 also includes an anti-parallel diode 30 connected in parallel therewith. It is envisaged that each switching element 26 may be a different switching device such as a gate turn-off thyristor, a field effect transistor, an injection-enhanced gate transistor, an integrated gate commutated thyristor or any other self-commutated semiconductor device.

The capacitor 28 of each 2-quadrant unipolar module is selectively bypassed or inserted into the chain-link converter 22 by changing the state of the switching elements 26. This selectively directs current through the capacitor 28 or causes current to bypass the capacitor 28, so that each 2-quadrant unipolar module provides a zero or positive voltage.

The capacitor 28 of each 2-quadrant unipolar module is bypassed when the pair of switching elements 26 in each 2-quadrant unipolar module is configured to form a short circuit in the 2-quadrant unipolar module. This causes current in the chain-link converter 22 to pass through the short circuit and bypass the capacitor 28, and so the 2-quadrant unipolar module provides a zero voltage, i.e. the 2-quadrant unipolar module is configured in a bypassed mode.

The capacitor 28 of each 2-quadrant unipolar module is inserted into the chain-link converter 22 when the pair of switching elements 26 in each 2-quadrant unipolar module is configured to allow the current in the chain-link converter 22 to flow into and out of the capacitor 28. The capacitor 28 then charges or discharges its stored energy so as to provide a non-zero voltage, i.e. the 2-quadrant unipolar module is configured in a non-bypassed mode.

It is possible to build up a combined voltage across each chain-link converter 22, which is higher than the voltage available from each of its individual modules, via the insertion of the capacitors 28 of multiple modules, each providing its own voltage, into each chain-link converter 22. In this manner switching of the switching elements 26 of each module causes each chain-link converter 22 to provide a stepped variable voltage source, which permits the generation of a voltage waveform across each chain-link converter 22 using a step-wise approximation. Operation of each chain-link converter 22 in this manner can be used to generate an AC voltage waveform at the AC terminal 16 so as to enable the voltage source converter to transfer power between the AC and DC networks.

Each first electrical apparatus 10 further includes a protection device 32. The protection device 32 is connected across an electrical block 34 that includes all of the chain-link modules 24 of the corresponding chain-link converter 22.

Each protection device 32 includes a plurality of series-connected diodes 36. The series-connected diodes 36 are arranged such that the protection device 32 is switched, in use, to a reverse-biased state when at least one chain-link module 24 of the electrical block 34 is configured in the non-bypassed mode, and a forward-biased state when all of the chain-link modules 24 of the electrical block 34 is configured in the bypassed mode.

In this manner the protection device 32 selectively provides a current-conductive path that forms an alternative route for any current flowing in the first electrical apparatus 10.

The connection of the protection device 32 across the electrical block 34 means that the protection device 32 is configured to allow a current flowing in the protection device 32 to fully bypass the electrical block 34. In other words, a current flowing in the plurality of series-connected diodes 36 of the protection device 32 is inhibited from flowing into the plurality of chain-link modules 24 forming part of the electrical block 34.

Operation of each first electrical apparatus 10 is described as follows, with reference to FIGS. 1a and 1b.

During normal operation of the first electrical apparatus 10, each chain-link module 24 is configured in either the non-bypassed or bypassed mode to enable the chain-link converter 22 to provide a stepped variable voltage source, so as to generate an AC voltage waveform at the AC terminal 16 and thereby enable the voltage source converter to transfer power between the AC and DC networks. The protection device 32 is not directly involved in the normal operation of the first electrical apparatus 10.

As mentioned above, the protection device 32 is switched to a reverse-biased state when at least one chain-link module 24 of the electrical block 34 is configured in the non-bypassed mode. The protection device 32 in the reverse-biased state has minimal effect on the normal operation of the first electrical apparatus 10.

At some point during the generation of the AC voltage waveform at the AC terminal 16, all of the chain-link modules 24 of the electrical block 34 are configured in the bypassed mode. As mentioned above, the protection device 32 is switched to a forward-biased state when all of the chain-link modules 24 of the electrical block 34 are configured in the bypassed mode and the direction of current in the electrical block 34 allows switching of the protection device 32 to a forward-biased state. However, the shape of a AC voltage waveform typically used in voltage source conversion based on chain-link converters 22, e.g. a sinusoidal shape, is such that the configuration of all of the chain-link modules 24 of the electrical block 34 in the bypassed mode only happens for a relatively short period for each cycle. As such, the effect of the protection device 32 in the forward-biased state on the normal operation of the first electrical apparatus 10 is minimised.

In the event of a fault operating condition of the voltage source converter, a fault current flows through the converter limb and thereby the first electrical apparatus 10. In order to protect the chain-link converter 22, all of the chain-link modules 24 of the electrical block 34 are configured in the bypassed mode.

At the same time the configuration of all of the chain-link modules 24 of the electrical block 34 in the bypassed mode switches the protection device 32 to the forward-biased state and thereby causes formation of the current-conductive path. This allows at least part of the current flowing in the converter limb to bypass the electrical block 34 and thereby reduce the amount of current flowing through the electrical block 34. This in turn reduces the risk of an overcurrent damaging one or more of the chain-link modules 24 of the electrical block 34. In this manner the protection device 32 protects the chain-link modules 24 of each electrical block 34 from being adversely affected by the fault current flowing through the first electrical apparatus 10.

The configuration of the protection device 32 according to the invention (i.e. use of a plurality of series-connected diodes 36 in the protection device 32 together with the connection of the protection device 32 across an electrical block 34 including multiple chain-link modules 24) is beneficial for the following reasons.

Under circumstances in which each protection device 32 forms a current-conductive path during normal operation of the voltage source converter, the configuration of the protection device 32 as set out above minimises any current overshoot that may occur when one or more chain-link modules 24 of the electrical block 34 is subsequently reconfigured in the non-bypassed mode, thereby reverse-biasing the protection device 32. In particular, the reverse-biasing of the series-connected diodes 36 of the protection device 32 results in a peak reverse current, which will be experienced as a forward current overshoot in the IGBT that was turned on moments earlier. The current overshoot only occurs on reconfiguration of the first of the plurality of chain-link modules 24 of the electrical block 34 in the non-bypassed mode, but does not occur on subsequent reconfiguration of the remaining chain-link modules 24 of the electrical block 34 in the non-bypassed mode. This means that the step voltage seen by the protection device 32 will be relatively low. This, together with the relatively large inductance of the loop formed by the protection device 32 and electrical block 34, results in a relatively low rate of change of current and hence a relatively low peak reverse current during reverse-biasing of the series-connected diodes 36 of the protection device 32 and thereby a relatively low current overshoot.

The use of a plurality of series-connected diodes 36 in the protection device 32 means that a failure of a single series-connected diode 36 of the protection device 32 does not cause an external short circuit across the electrical block 34 to which the protection device is connected. This in turn minimises the risk of occurrence of a type 2 short circuit in the electrical block 34. In comparison use of only a single diode in the protection device 32 would create a risk of occurrence of the aforementioned type 2 short circuit.

In addition the voltage rating of each series-connected diode 36 of the protection device 32 can be optimised independently of the individual voltage ratings of the IGBTs and anti-parallel diodes 30 of each chain-link module 24 of the electrical block 34. This allows the number of series-connected diodes 36 to be different, rather than equal, to the number of chain-link modules 24, if such a configuration is required to form a more efficient first electrical apparatus 10. In contrast, use of a single diode as a protection device 32 that is connected across a single chain-link module 24 means that it is necessary to match the voltage rating of the single semiconductor device to the voltage rating of that single chain-link module 24, which may adversely affect the efficiency of the protection device 32 in terms of cost, size and weight.

Furthermore the configuration of the protection device 32 as set out above reduces the number of clamps required to connect the protection device 32 across the electrical block 34 in comparison to the number of clamps required to connect multiple diodes each across a respective one of a plurality of chain-link modules 24. This in turn results in savings in terms of overall cost, size and weight of the first electrical apparatus 10.

It will be appreciated that the number of chain-link modules 24 in the electrical block 34 may range from two up to all of the chain-link modules 24 of the chain-link converter 22.

In other embodiments of the invention (not shown), it is envisaged that one or more switching elements 26 may be a different switching device such as a gate turn-off thyristor, a field effect transistor, an injection-enhanced gate transistor, an integrated gate commutated thyristor or any other self-commutated semiconductor device. In each instance, the switching device is connected in parallel with an anti-parallel diode 30.

It is envisaged that, in other embodiments of the invention (not shown), the capacitor 28 in each chain-link module 24 may be replaced by a different energy storage device such as a fuel cell, a battery or any other energy storage device capable of storing and releasing its electrical energy to provide a voltage.

It is further envisaged that, in other embodiments of the invention (not shown), each chain link module may have a different arrangement that includes at least one switching element and at least one energy storage device, the or each switching element and the or each energy storage device combining to selectively provide a voltage source. For example, each chain-link module may take the form of any of the modules described in WO 2011/124260 A1.

It will be further appreciated that, in other embodiments of the invention, the first electrical apparatus 10 may form part of a different type of voltage source converter, form a voltage source converter by itself, or form another type of electrical apparatus with a different function.

Figure 2:
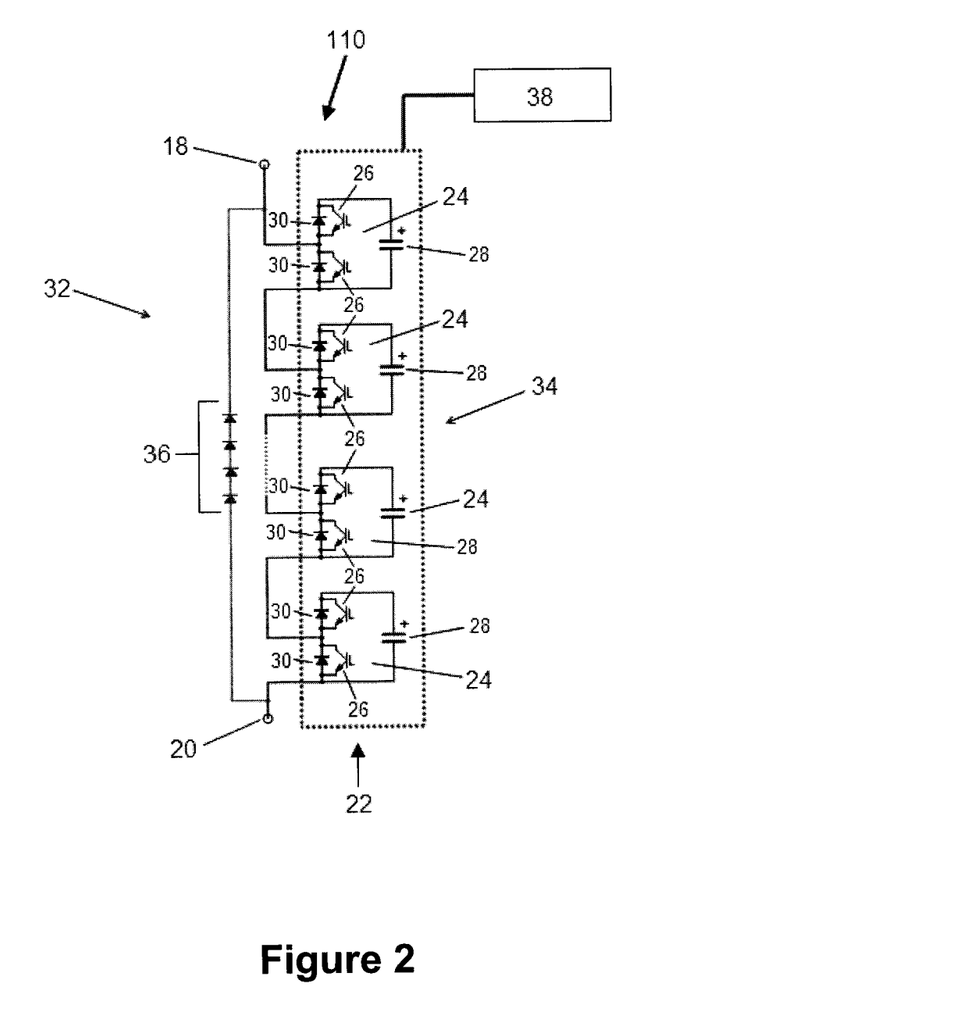
FIG. 2 shows, in schematic form, an electrical apparatus according to a second embodiment of the invention.

A second electrical apparatus 110 according to a second embodiment of the invention is shown in FIG. 2. The second electrical apparatus 110 shown in FIG. 2 is similar in structure and operation to the first electrical apparatus 10 shown in FIG. 1a, and like features share the same reference numerals.

The second electrical apparatus 110 differs from the first electrical apparatus 10 in that the second electrical apparatus 110 further includes a switching control unit 38 that controls the switching of the chain-link modules 24 of the electrical block 34 to selectively configure at least one chain-link module 24 of the electrical block 34 in the non-bypassed mode so as to maintain the protection device 32 in the reversed-biased state during normal operation of the second electrical apparatus 110.

The use of the switching control unit 38 prevents unwanted formation of the current-conductive path during normal operation of the second electrical apparatus 110, and thereby overcomes the problem of the formation of the current-conductive path having an effect on the normal operation of the second electrical apparatus 110.

Furthermore the use of the switching control unit 38, by preventing current flow in the protection device during the normal operation of the electrical apparatus, removes the need for cooling of the series-connected diodes 36 of the protection device 32, thus providing cost savings.

Figure 3:
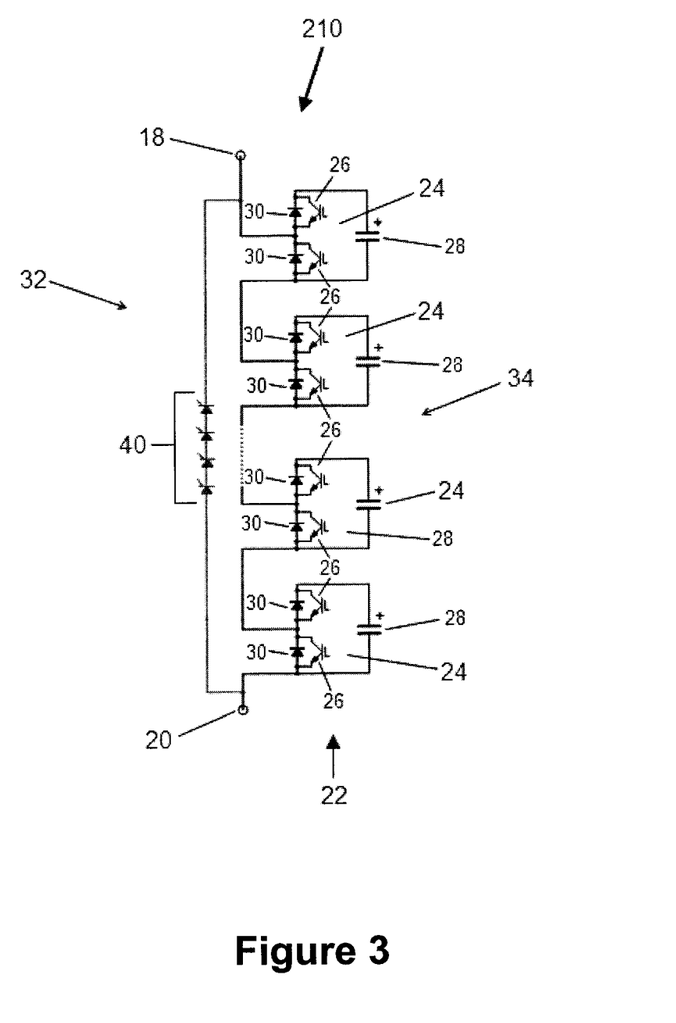
FIG. 3 shows, in schematic form, an electrical apparatus according to a third embodiment of the invention.

A third electrical apparatus 210 according to a third embodiment of the invention is shown in FIG. 3. The third electrical apparatus 210 shown in FIG. 3 is similar in structure and operation to the first electrical apparatus 10 shown in FIG. 1a, and like features share the same reference numerals.

The third electrical apparatus 210 differs from the first electrical apparatus 10 in that, in the protection device 32 of the third electrical apparatus 210, the plurality of series-connected diodes 36 is replaced by a plurality of series-connected thyristors 40.

Use of a plurality of series-connected thyristors 40 in the protection device 32 provides active control over the formation of the current-conductive path to ensure that the current-conductive path is only formed during a fault operating condition of the third electrical apparatus 210. The benefits of preventing unwanted formation of the current-conductive path during the normal operation of the third electrical apparatus 210 are the same as the aforementioned benefits of preventing unwanted formation of the current-conductive path during the normal operation of the second electrical apparatus 110.

Figure 4:
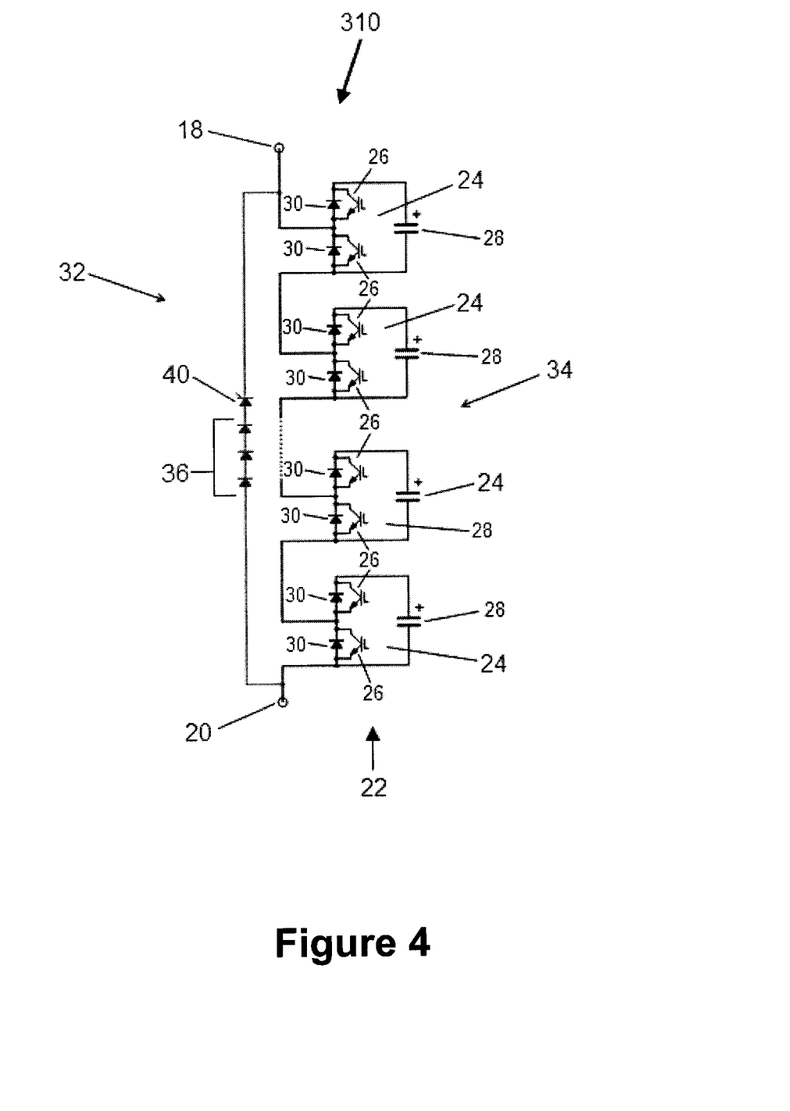
FIG. 4 shows, in schematic form, an electrical apparatus according to a fourth embodiment of the invention.

A fourth electrical apparatus 310 according to a fourth embodiment of the invention is shown in FIG. 4. The fourth electrical apparatus 310 shown in FIG. 4 is similar in structure and operation to the second electrical apparatus 110 shown in FIG. 2, and like features share the same reference numerals.

The fourth electrical apparatus 310 differs from the second electrical apparatus 110 in that, in the protection device 32 of the fourth electrical apparatus 310, one of the plurality of series-connected diodes 36 is replaced by a thyristor 40.

In use, the thyristor 40 is controllable to selectively permit current flow through the protection device 32. In this manner the thyristor 40 can be controlled to selectively prevent unwanted formation of the current-conductive path during normal operation of the fourth electrical apparatus 310 or allow formation of the current-conductive path during a fault operating condition of the fourth electrical apparatus 310.

The protection device 32 requires a high reverse voltage rating that is at least equal to the sum of the capacitor 28 voltages of all the chain-link modules 24 of the electrical block 34. On the other hand the protection device 32 requires a relatively low forward voltage rating, which may be two orders of magnitude smaller than the required reverse voltage rating, since the highest forward voltage experienced by the protection device 32 is equal to the sum of the on-state voltages of the anti-parallel diodes 30 of the electrical block 34 during a fault operating condition of the fourth electrical apparatus 310.

The combination of a thyristor 40 connected in series with a plurality of series-connected diodes 36 in the protection device 32 allows the total on-state voltage of the protection device 32 to be lowered, since the on-state voltage of a diode is less than that of a thyristor 40 of comparable size and voltage rating, whilst maintaining a high, overall reverse voltage capability that is primarily provided by the plurality of series-connected diodes 36.

The configuration of each protection device 32 of the fourth electrical apparatus 310 therefore provides further flexibility in terms of optimising the design of the fourth electrical apparatus 310 to improve its efficiency.

The number (single or multiple) of thyristors 40 and diodes in the protection device 32 may vary depending on the required voltage rating(s) of the protection device 32.

Figure 5:
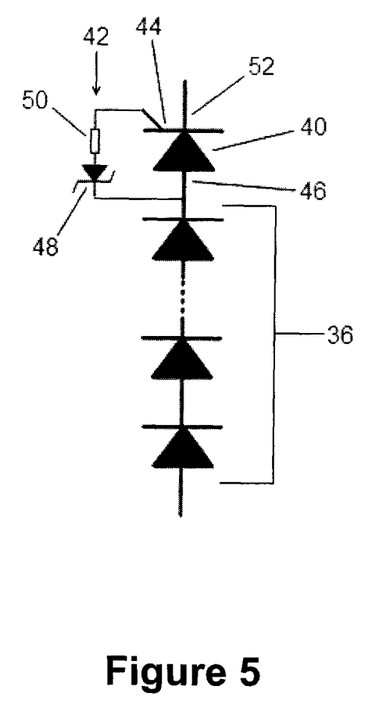
FIG. 5 shows, in schematic form, a control circuit for controlling the switching of the thyristor of the protection device shown in FIG. 4.

FIG. 5 shows, in schematic form, a control circuit 42 for controlling the switching of the thyristor 40 of the protection device 32 shown in FIG. 4.

The control circuit 42 is connected across a control electrode 44 and an anode 46 of the thyristor 40. The control circuit 42 includes a Zener diode 48 connected in series with a current-limiting resistor 50. It is envisaged that, in other embodiments of the invention, the Zener diode 48 may be replaced by any device that conducts current when a predefined voltage appears across that device, e.g. a breakover diode.

In use, the non-linear voltage characteristic of the Zener diode 48 provides the control circuit 42 with an impedance that is variable to selectively allow a non-zero voltage to be applied across the control electrode 44 and a cathode 52 of the thyristor 40 in order to switch the thyristor 40 to an on-state when the Zener diode 48 has a voltage thereacross that matches or exceeds its protection voltage.

During normal operation of the fourth electrical apparatus 310, the voltage across the protection device 32 will either be negative or less positive than the sum of the on-state voltages of the anti-parallel diodes 30 in the electrical block 34. On the other hand a fault operating condition of the fourth electrical apparatus 310 results in an increase in the sum of the on-state voltages of the anti-parallel diodes 30 in the electrical block 34 over its normal value during normal operation.

Accordingly the protection voltage of the Zener diode 48 is set to correspond to a voltage level that is higher than the sum of the on-state voltages of the anti-parallel diodes 30 during normal operation of the fourth electrical apparatus 310, such that the control circuit 42 only allows a non-zero voltage to be applied across the control electrode 44 and cathode 52 of the thyristor 40 in order to switch the thyristor 40 to an on-state during a fault operating condition of the fourth electrical apparatus 310. This thereby prevents formation of the current-conductive path during normal operation of the fourth electrical apparatus 310.

Furthermore the protection voltage of the Zener diode 48 is also set to correspond to a voltage level that is below a safety voltage level which corresponds to failure of one or more of the anti-parallel diodes 30 of the corresponding electrical block 34. Failure of an anti-parallel diode 30 of the electrical block 34 is defined as a state of that anti-parallel diode 30 that does not allow the electrical block 34 to carry out its normal function. Such failure may be caused by, for example, overcurrent and/or thermal stress. In this manner the risk of failure of one or more anti-parallel diodes 30 of the electrical block 34, before the current-conductive path is formed, is minimised.

The use of the control circuit 42 therefore permits automatic formation of the current-conductive path, when required, without using a separate gate drive circuit with associated power supply and communication links, whilst maintaining the capability of the protection device 32 to prevent unwanted formation of the current-conductive path during normal operation of the fourth electrical apparatus 310.

It is envisaged that, in other embodiments of the invention, the control circuit 42 shown in FIG. 5 may be used to control the switching of each thyristor 40 of the third electrical apparatus shown in FIG. 3.

Figure 6:
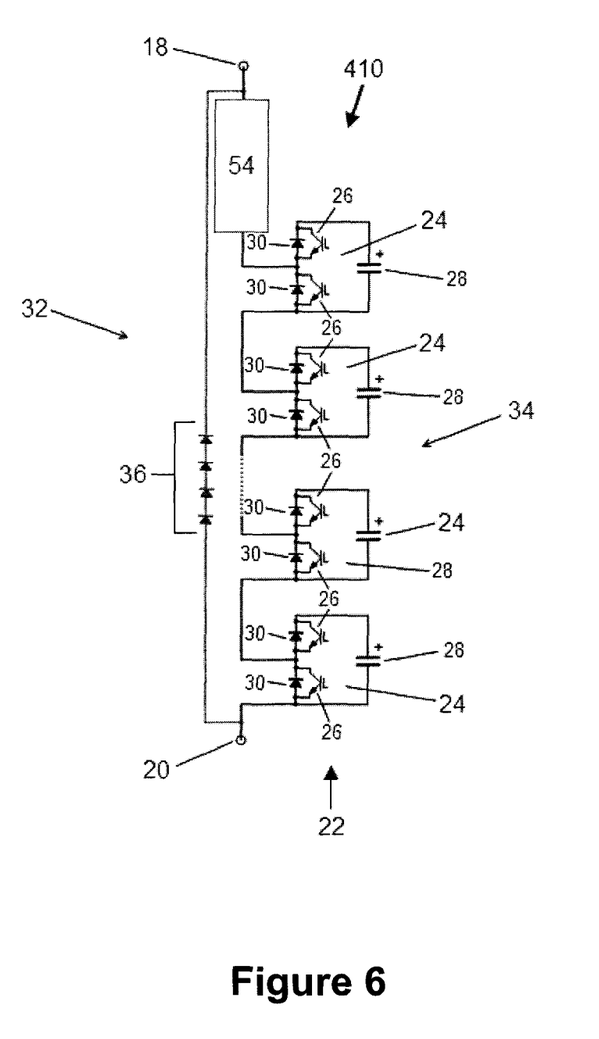
FIG. 6 shows, in schematic form, an electrical apparatus according to a fifth embodiment of the invention.

A fifth electrical apparatus 410 according to a fifth embodiment of the invention is shown in FIG. 6. The fifth electrical apparatus 410 shown in FIG. 6 is similar in structure and operation to the first electrical apparatus 10 shown in FIG. 1a, and like features share the same reference numerals.

The fifth electrical apparatus 410 differs from the first electrical apparatus 10 in that the fifth electrical apparatus 410 further includes a reactor 54 connected in series with the plurality of chain-link modules 24.

The electrical block 34 includes the reactor 54 such that the protection device 32 is connected across a series-connection of the reactor 54 and chain-link converter 22.

During a fault operating condition of the electrical apparatus the initial rate of rise of fault current through the electrical block 34 causes a voltage drop to appear across the reactor 54. The presence of the voltage drop in the electrical block 34 means that the current-conductive path formed by the protection device 32 presents a lower impedance path for the fault current than the electrical block 34. In this manner the proportion of the fault current flowing through the electrical block 34 can be reduced.

Figure 7:
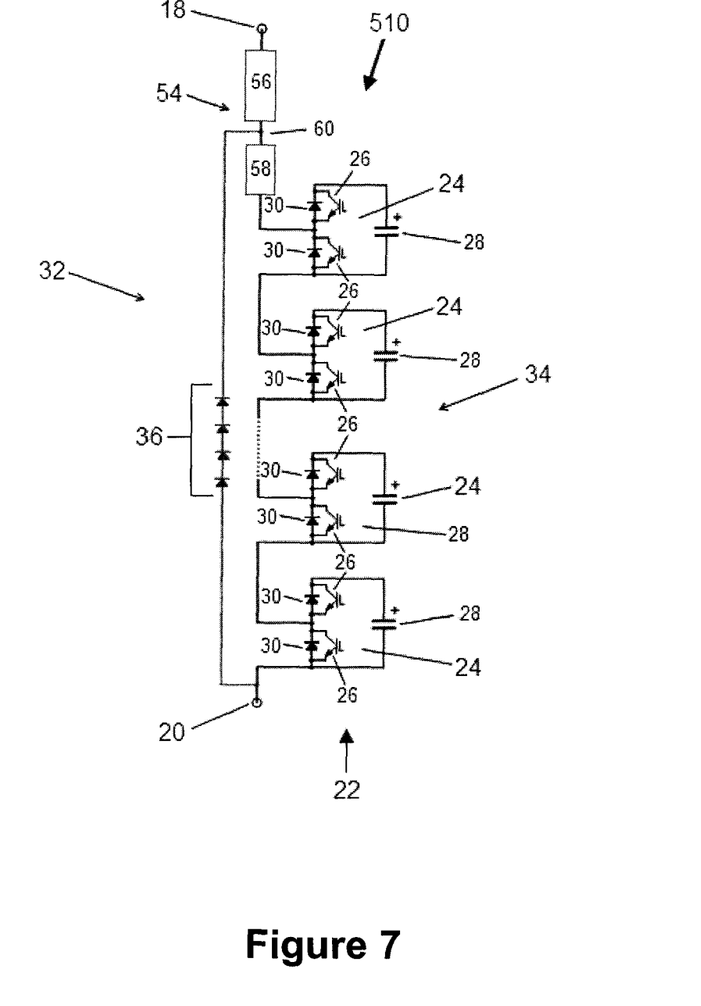
FIG. 7 shows, in schematic form, an electrical apparatus according to a sixth embodiment of the invention.

A sixth electrical apparatus 510 according to a sixth embodiment of the invention is shown in FIG. 7. The sixth electrical apparatus 510 shown in FIG. 7 is similar in structure and operation to the fifth electrical apparatus 410 shown in FIG. 6, and like features share the same reference numerals.

The sixth electrical apparatus 510 differs from the fifth electrical apparatus 410 in that, in the sixth electrical apparatus 510, the electrical block 34 includes only part of the reactor 54.

In the embodiment shown, the sixth electrical apparatus 510 is configured so that the reactor 54 is split into a pair of reactor elements 56,58 and the protection device 32 is connected to a junction 60 between the pair of reactor elements 56,58 such that the electrical block 34 includes one of the reactor elements 58. In this manner the protection device 32 is connected across a series-connection of a reactor element 58 and the chain-link converter 22.

Alternatively the sixth electrical apparatus 510 can be configured so that the protection device 32 is connected to a tap on the reactor 54 such that the electrical block 34 includes part of the reactor 54. In this manner the protection device 32 is connected across a series-connection of part of the reactor 54 and the chain-link converter 22.

Configuration of the sixth electrical apparatus 510 in this manner permits the reactor 54 to be readily designed such that the amount of reactance forming part of the electrical block 34 optimises the proportion of current flowing through the protection device 32 so as to reduce the amount of current flowing through the electrical block 34.

Figure 8:
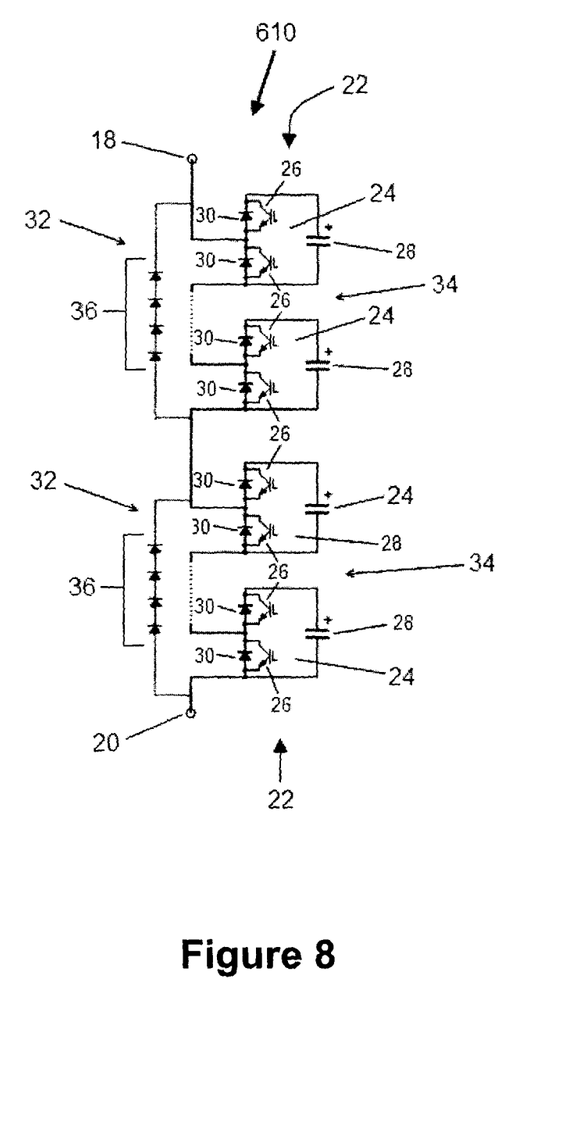
FIG. 8 shows, in schematic form, an electrical apparatus according to a seventh embodiment of the invention.

A seventh electrical apparatus 610 according to a seventh embodiment of the invention is shown in FIG. 8. The seventh electrical apparatus 610 shown in FIG. 8 is similar in structure and operation to the first electrical apparatus 10 shown in FIG. 1a, and like features share the same reference numerals.

The seventh electrical apparatus 610 differs from the first electrical apparatus 10 in that the seventh electrical apparatus 610 includes a plurality of protection devices 32 and a plurality of electrical blocks 34.

In the embodiment shown, the seventh electrical apparatus 610 includes first and second electrical blocks 34. Each protection device 32 is connected across a respective one of the electrical blocks 34.

The first electrical block 34 includes a plurality of chain-link modules 24 of the chain-link converter 22, while the second electrical block 34 includes another plurality of chain-link modules 24 of the chain-link converter 22. As with the protection device 32 of each of the aforementioned embodiments, each protection device 32 of the seventh electrical apparatus 610 selectively provides a current-conductive path to allow any current flowing in the seventh electrical apparatus 610 to bypass the corresponding electrical block 34.

The use of a plurality of protection devices 32 in the seventh electrical apparatus 610 is advantageous for configurations in which the physical layout of the chain-link modules 24 means that it is more efficient to use multiple protection devices 32, instead of a single protection device 32, to protect the seventh electrical apparatus 610.

The invention claimed is:

1. An electrical apparatus comprising:
   first and second terminals for connection to an electrical circuit;
   a chain-link converter connected between the first and second terminals, the chain-link converter including a plurality of chain-link modules, each chain-link module including at least one switching element and at least one energy storage device, the or each switching element and the or each energy storage device of each chain-link module combining to selectively provide a voltage source; and
   a protection device connected in parallel with an electrical block that includes at least two of the plurality of chain-link modules, the protection device including a plurality of series-connected semiconductor devices, wherein the protection device selectively provides a current-conductive path to allow at least part of a current flowing in the electrical apparatus to fully bypass the electrical block.

2. An electrical apparatus according to claim 1 wherein the plurality of series-connected semiconductor devices is any one of:
   a plurality of series-connected passive semiconductor devices;
   a plurality of series-connected active semiconductor devices; or
   at least one active semiconductor device connected in series with at least one passive semiconductor device.

3. An electrical apparatus according to claim 1 wherein the protection device is switched, in use, to a reverse-biased state when at least one chain-link module of the electrical block is configured to provide a non-zero voltage in a non-bypassed mode, and a forward-biased state when all of the chain-link modules of the electrical block are configured to provide a zero voltage in a bypassed mode and the direction of current in the electrical block allows switching of the protection device to a forward-biased state.

4. An electrical apparatus according to claim 3 further including a switching control unit, wherein the switching control unit controls the switching of the chain-link modules of the electrical block to selectively configure at least one chain-link module of the electrical block in the non-bypassed mode so as to maintain the protection device in the reversed-biased state during normal operation of the electrical apparatus.

5. An electrical apparatus according to claim 1 wherein the plurality of series-connected semiconductor devices includes: at least one passive semiconductor device, and the protection device includes a switching element to selectively inhibit or allow conduction of the or each passive semiconductor device.

6. An electrical apparatus according to claim 1 wherein the protection device includes at least one control circuit and at least one active semiconductor device, the or each control circuit being connected across a control electrode and an anode of the active semiconductor device or a respective one of the active semiconductor devices, wherein an impedance of the or each control circuit is variable to selectively allow a non-zero voltage to be applied across the control electrode and a cathode of the corresponding active semiconductor device in order to switch that active semiconductor device to an on-state.

7. An electrical apparatus according to claim 6 wherein the control circuit includes a resistive element with a non-linear voltage-current characteristic.

8. An electrical apparatus according to claim 6 wherein the impedance of the or each control circuit varies to allow a non-zero voltage to be applied across the control electrode and a cathode of the corresponding active semiconductor device when the or each control circuit has a voltage thereacross that matches or exceeds a predetermined voltage threshold.

9. An electrical apparatus according to claim 8 wherein the predetermined voltage threshold corresponds to a fault operating condition of the electrical apparatus.

10. An electrical apparatus according to claim 8 wherein the predetermined voltage threshold is below a safety voltage level which corresponds to failure of one or more components of the electrical block.

11. An electrical apparatus according to claim 1 further including a reactor connected in series with the plurality of chain-link modules, wherein the electrical block includes at least part of the reactor.

12. An electrical apparatus according to claim 11 wherein the protection device is connected to a tap on the reactor such that the electrical block includes part of the reactor.

13. An electrical apparatus according to claim 11 wherein the reactor is split into a plurality of reactor elements, and the protection device is connected to a junction between two of the plurality of the reactor elements such that the electrical block includes at least one of the reactor elements.

14. An electrical apparatus according to claim 1 including a plurality of protection devices and a plurality of electrical blocks, wherein each protection device is connected across a respective one of the electrical blocks, each electrical block including at least two of the plurality of chain-link modules, each protection device including a plurality of series-connected semiconductor devices, wherein each protection device selectively provides a current-conductive path to allow current flowing in the electrical apparatus to bypass the corresponding electrical block.

* * * * *